US012801821B2

United States Patent

(12) United States Patent
Ethridge et al.

(10) Patent No.: US 12,801,821 B2
(45) Date of Patent: Nov. 17, 2026

(54) COUPON AND METHOD FOR INTERNAL REGISTRATION FOR MAXIMIZING BACKDRILL-TO-METAL CLEARANCE

(71) Applicant: Dell Products L.P., Round Rock, TX (US)

(72) Inventors: Steven R. Ethridge, Austin, TX (US); Sandor Farkas, Round Rock, TX (US); Bhyrav M. Mutnury, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 572 days.

(21) Appl. No.: 18/497,203

(22) Filed: Oct. 30, 2023

(65) Prior Publication Data

US 2025/0139347 A1 May 1, 2025

(51) Int. Cl.

| | |
|---|---|
| ***G06F 30/392*** | (2020.01) |
| ***G06F 17/14*** | (2006.01) |
| ***G06F 30/30*** | (2020.01) |
| ***H05K 3/00*** | (2006.01) |
| *G06F 115/12* | (2020.01) |

(52) U.S. Cl.
CPC .......... *G06F 30/392* (2020.01); *G06F 17/142* (2013.01); *H05K 3/0005* (2013.01); *G06F 2115/12* (2020.01)

(58) Field of Classification Search
None
See application file for complete search history.

(56) References Cited

U.S. PATENT DOCUMENTS

| | | | | |
|---|---|---|---|---|
| 7,676,920 | B2 * | 3/2010 | Farkas | H05K 1/0268 29/830 |
| 8,255,849 | B1 * | 8/2012 | Okhmatovski | G06F 30/367 716/110 |
| 12,586,175 | B2 * | 3/2026 | Chng | G06T 7/001 |
| 2014/0353005 | A1 * | 12/2014 | Nair | H05K 1/0306 174/250 |

OTHER PUBLICATIONS

IPC International, Inc., "IPC-2221B Appendix A Version 4.0," Apr. 2022, 17 pages. (Year: 2022).*

* cited by examiner

*Primary Examiner* — Leigh M Garbowski
(74) *Attorney, Agent, or Firm* — McDermott Will & Schulte LLP

(57) ABSTRACT

In one or more embodiments, a coupon with a plurality of cutouts based on a chirp waveform may be used to align a drilling machine to a PCB. Light may be passed through the coupon and a camera may capture the light. A processor may perform zero padding, calculate a two-dimensional (2D) fast Fourier transform (FFT) of the image, multiply by a pre-calculated complex conjugate 2D FFT of the coupon, then calculate a cross correlation based on an inverse 2D FFT. Embodiments may find the best fitting coordinates of the peaks and use the coordinate as a correction factor for referencing a drilling machine to ensure drills are centered and/or aligned relative to power plane pads or antipads.

19 Claims, 6 Drawing Sheets

COUPON AND METHOD FOR INTERNAL REGISTRATION FOR MAXIMIZING BACKDRILL-TO-METAL CLEARANCE

BACKGROUND

Field of the Disclosure

This disclosure relates generally to printed circuit boards (PCBs) in information handling systems and more particularly to backdrill-to-metal registration.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments may be directed to a coupon for internal registration to an inner layer of a printed circuit board (PCB). The coupon may comprise a block of laminate material and a plurality of cutouts in the block of material, wherein each cutout of the plurality of cutouts has a width based on a chirp waveform associated with a light source and each cutout of the plurality of cutouts is separated by an adjacent cutout based on the chirp waveform. In some embodiments, each cutout of the plurality of cutouts comprises a rectangular shape. In some embodiments, the coupon is configured for registration in a first direction. In some embodiments, each cutout of the plurality of cutouts has a length based on a fiber pitch. In some embodiments, the length is twice the fiber pitch. In some embodiments, the plurality of cutouts comprises concentric circles. In some embodiments, the coupon comprises copper.

Embodiments may be directed to a method for registration of a drill relative to an inner layer of a printed circuit board (PCB) laminate material. The method may comprise forming a coupon with a plurality of cutouts, wherein the plurality of cutouts and a length of each cutout of the plurality of cutouts is based on a chirp waveform; projecting light through the plurality of cutouts; capturing an image of the light passed through the plurality of cutouts; performing zero padding on the image of the image; for a plurality of peaks, performing: calculating a two-dimension (2D) fast Fourier transform (FFT) of the image; multiplying a result of the 2D FFT by a complex conjugate 2D FFT of the coupon; and calculating a cross-correlation using an inverse 2D FFT; and determining a best-fitting coordinate of the plurality of peaks. In some embodiments, each cutout of the plurality of cutouts comprises a rectangular shape. In some embodiments, the coupon is configured for registration in a first direction. In some embodiments, the method further comprises performing the method on a second coupon for registration in a second direction. In some embodiments, each cutout of the plurality of cutouts has a length based on a fiber pitch. In some embodiments, the length is twice the fiber pitch. In some embodiments, the plurality of cutouts comprises concentric circles.

Embodiments may be directed to a registration system for positioning a drill relative to a printed circuit board (PCB) laminate material. The registration system may comprise a light source for projecting light onto a PCB; a coupon comprising a plurality of cutouts, wherein each cutout of the plurality of cutouts has a width based on a chirp waveform and each cutout of the plurality of cutouts is separated by an adjacent cutout based on the chirp waveform; a camera for capturing an image of the light passed through the coupon; a processor; and a memory storing a set of instructions executable by the processor for: communicating with the light source to project the light onto the coupon; performing zero padding on the image of the image; for a plurality of iterations: calculating a two-dimension (2D) fast Fourier transform (FFT) of the image; multiplying a result of the 2D FFT by a complex conjugate 2D FFT of the coupon; calculating a cross-correlation using an inverse 2D FFT to determine a peak; and determining a best-fitting coordinate of the plurality of peaks. In some embodiments, the light source is a laser. In some embodiments, each cutout of the plurality of cutouts comprises a rectangular shape. In some embodiments, the coupon is configured for registration in a first direction. In some embodiments, the plurality of cutouts comprises concentric circles.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
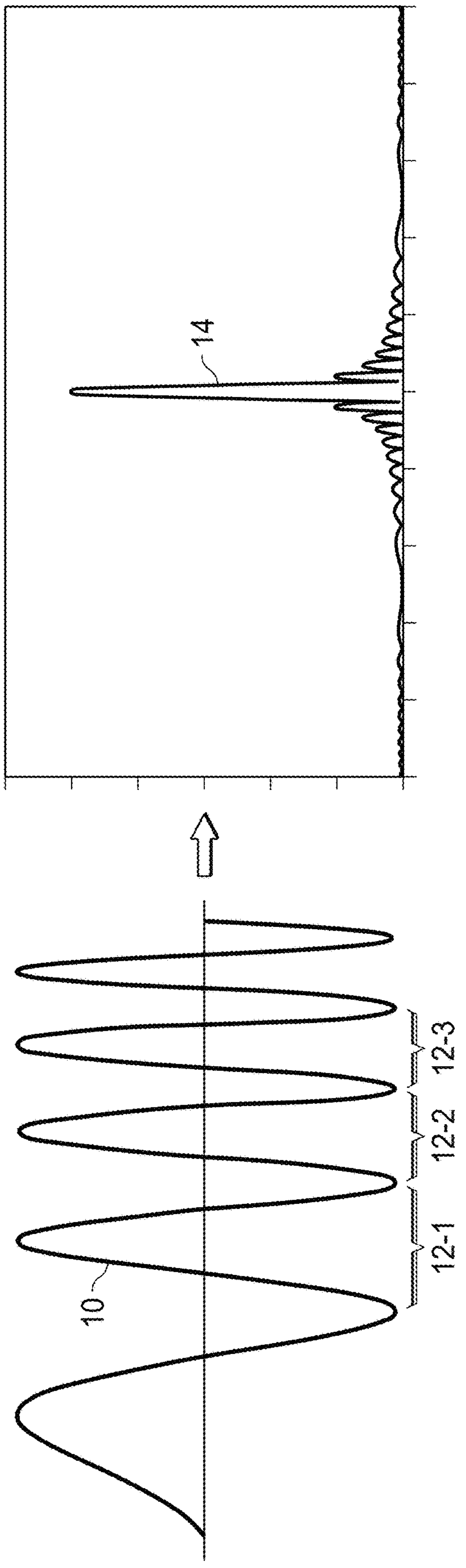
FIG. 1 depicts an example chirp waveform and its autocorrection.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

An information handling system (IHS) may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, an IHS may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS may include or have a form factor of that of or similar to one or more of a laptop, a notebook, a telephone, a tablet, and a PDA, among others. For example, a portable IHS may be readily carried and/or transported by a user (e.g., a person). In one or more embodiments, components of an IHS may include one or more storage devices, one or more communications ports for communicating with external devices as well as various input and output (I/O) devices, such as a keyboard, a mouse, and a video display, among others. In one or more embodiments, IHS may include one or more buses operable to transmit communication between or among two or more hardware components. In one example, a bus of an IHS may include one or more of a memory bus, a peripheral bus, and a local bus, among others. In another example, a bus of an IHS may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, an IHS may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

An IHS may include a processor, a volatile memory medium, non-volatile memory media, an I/O subsystem, and a network interface. Volatile memory medium, non-volatile memory media, I/O subsystem, and network interface may be communicatively coupled to processor. In one or more embodiments, one or more of volatile memory medium, non-volatile memory media, I/O subsystem, and network interface may be communicatively coupled to processor via one or more buses, one or more switches, and/or one or more root complexes, among others. In one example, one or more of a volatile memory medium, non-volatile memory media, an I/O subsystem, and network interface may be communicatively coupled to the processor via one or more PCI-Express (PCIe) root complexes. In another example, one or more of an I/O subsystem and a network interface may be communicatively coupled to processor via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

A volatile memory medium may include volatile storage such as, for example, RAM, DRAM (dynamic RAM), EDO RAM (extended data out RAM), SRAM (static RAM), etc. One or more of non-volatile memory media may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, a network interface may be utilized in communicating with one or more networks and/or one or more other information handling systems. In one example, network interface may enable an IHS to communicate via a network utilizing a suitable transmission protocol and/or standard. In a second example, a network interface may be coupled to a wired network. In a third example, a network interface may be coupled to an optical network. In another example, a network interface may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, a network interface may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, a processor may execute processor instructions in implementing at least a portion of one or more systems, at least a portion of one or more flowcharts, at least a portion of one or more methods, and/or at least a portion of one or more processes. In one example, a processor may execute processor instructions from one or more memory media in implementing at least a portion of one or more systems, at least a portion of one or more flowcharts, at least a portion of one or more methods, and/or at least a portion of one or more processes. In another example, a processor may execute processor instructions via a network interface in implementing at least a portion of one or more systems, at least a portion of one or more flowcharts, at least a portion of one or more methods, and/or at least a portion of one or more processes.

In one or more embodiments, a processor may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, a processor may interpret and/or execute program instructions and/or process data stored locally (e.g., via memory media and/or another component of an IHS). In another example, a processor may interpret and/or execute program instructions and/or process data stored remotely (e.g., via a network storage resource).

In one or more embodiments, an I/O subsystem may represent a variety of communication interfaces, graphics interfaces, video interfaces, user input interfaces, and/or peripheral interfaces, among others. For example, an I/O subsystem may include one or more of a touch panel and a display adapter, among others. For instance, a touch panel may include circuitry that enables touch functionality in conjunction with a display that is driven by a display adapter.

A non-volatile memory medium may include an operating system (OS) and applications (APPs). In one or more embodiments, one or more of an OS and APPs may include processor instructions executable by a processor. In one example, a processor may execute processor instructions of one or more of OS and APPs via a non-volatile memory medium. In another example, one or more portions of the processor instructions of one or more of an OS and APPs may be transferred to a volatile memory medium and a processor may execute the one or more portions of the processor instructions.

Non-volatile memory medium may include information handling system firmware (IHSFW). In one or more embodiments, IHSFW may include processor instructions executable by a processor. For example, IHSFW may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, a processor may execute processor instructions of IHSFW via non-volatile memory medium. In another instance, one or more portions of the processor instructions of IHSFW may be transferred to volatile memory medium, and processor may execute the one or more portions of the processor instructions of IHSFW via volatile memory medium.

Information handling systems utilize printed circuit boards (PCBs) for processing and communicating information. There are several tolerances present during PCB manufacturing. For example, layer-to-layer tolerance may be 0.5 mil within a core, and up to 2 mils across many cores in a stackup. Drill and backdrill positioning can be off by 2 mils. Backdrill positioning can be enhanced by an optical system that can reference to an outer layer pad or a hole. However, due to the layer-to-layer tolerances, perfect backdrill to internal plane alignment cannot be assured. These tolerances will reduce backdrill-to-metal distances and reduce conductive anodic filament (CAF) resistance, and it can force the designer to use expensive resin fill. It can also force designers to have large clearance distances that will result in routing inefficiency and add extra layers for the same routing. The tolerances may be especially critical on the inner power planes since higher voltages encourage CAF growth.

In PCB manufacturing, fiducials may refer to standards of reference for measuring, including alignment, and coupons may refer to sections on a PCB that are designed with specific dimensions and electrical properties for reference. Many fiducials and registration coupons cannot be used on the inner layers since the resin and fiberglass alters the image to the point where exact positioning is not possible. The image of the coupon gets distorted by one or more of blurring through the opaque resin, modulation through the fiber glass bundles and random noise since the resin/glass is not uniform.

Embodiments of an internal registration system (e.g., a registration system for aligning drill heads and other machines relative to an inner layer of a PCB) may comprise a coupon that can handle distortions. Embodiments may have a robust autocorrelation response to allow exact positioning and alignment in noisy environments and may be large enough to bridge over the pitch of a fiber glass bundle. Advantageously, a registration coupon may maximize backdrill-to-metal clearance. Embodiments of an internal registration coupon may be formed based on a waveform.

To assist with finding a reference point of an inner layer, embodiments may include a coupon configured based on a waveform of light to be directed at the PCB. FIG. 1 depicts a chirp waveform 10 (e.g., a sine wave frequency that varies continuously over a range of values for a specific time period modulated by a ramp) and its correlation (e.g., a delayed copy of itself). The distance between troughs 12 (or crests) typically increases or decreases linearly for chirp waveforms 10.

Chirp waveform 10 may provide the best autocorrelation performance but may be difficult to implement as a shape.

Figure 2:
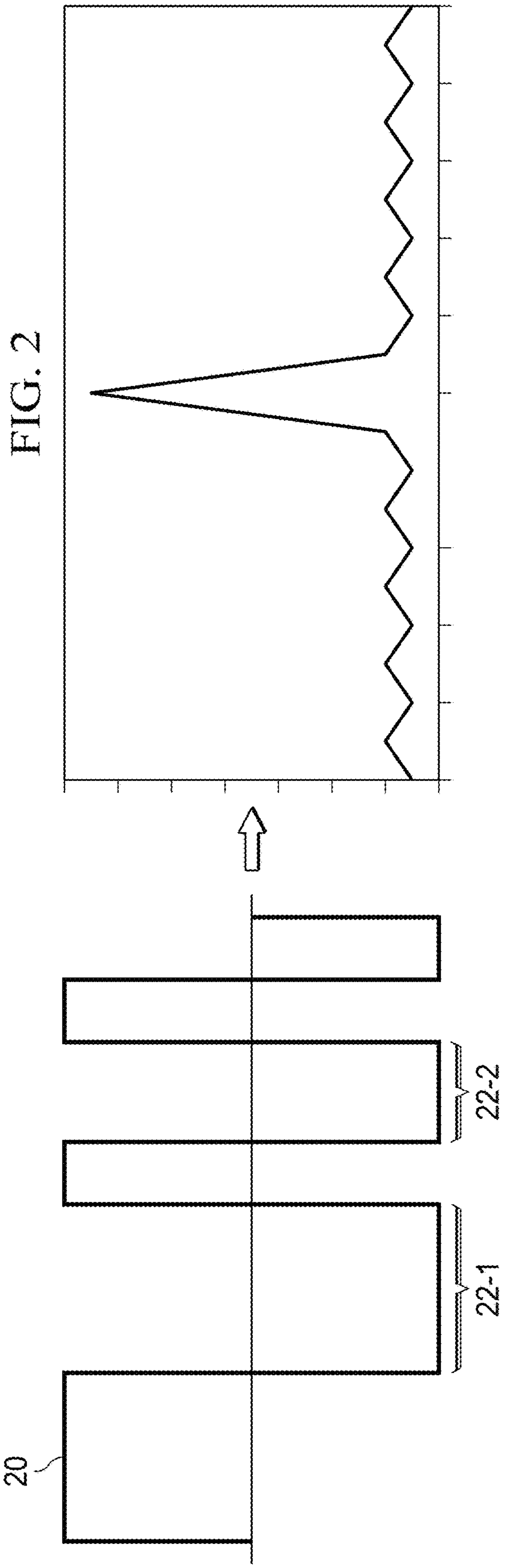
FIG. 2 depicts an example Barker waveform and its autocorrection based on the example chirp waveform of FIG. 1.

FIG. 2 depicts a Barker sequence 20 and its correlation 22 as a close approximation of a chirp waveform. Barker sequence 20 may comprise a finite sequence of digital values that resemble a sampled and quantized version of chirp signal 10. The example in FIG. 2 is 11 units wide and can be described as 11100010010, with each "0" representing a portion of coupon 30 and each "1" representing a portion of a cutout 32.

Figure 3:
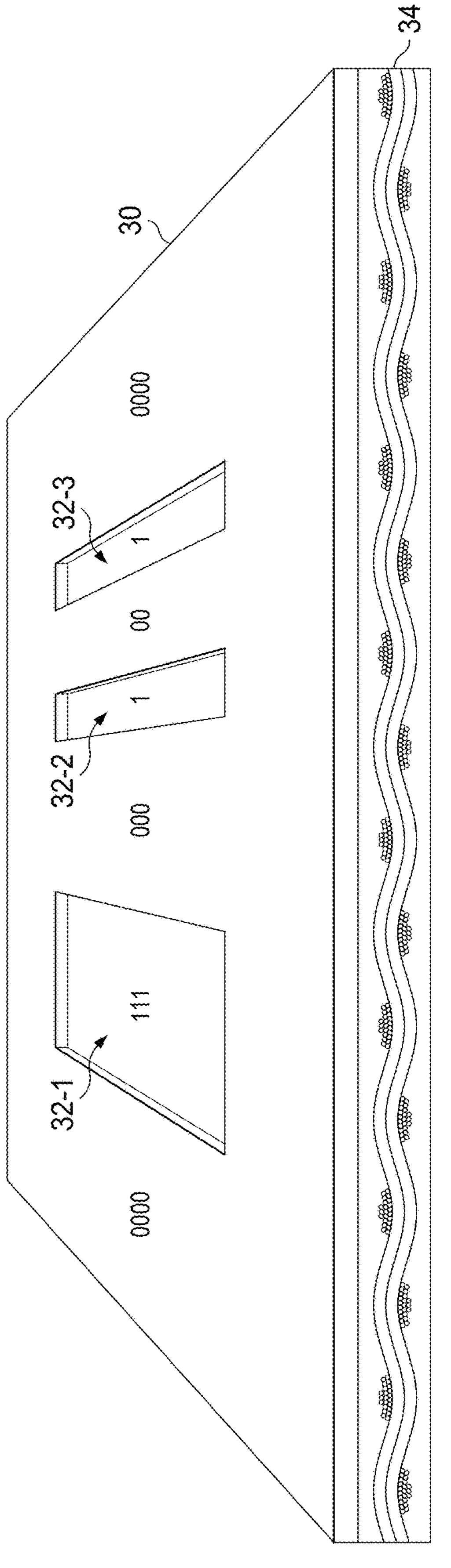
FIG. 3 depicts a perspective view of a printed circuit board (PCB) with an embodiment of a coupon with a plurality of cutouts based on the Barker waveform of FIG. 2.

FIG. 3 depicts a perspective view of a printed circuit board (PCB) laminate material 34 with an embodiment of a coupon comprising a layer 30 with a plurality of cutouts 32, wherein each cutout 32 is sized to pass light to follow the pattern associated with FIG. 2 to align PCB 34 in a first direction (e.g., a X-direction). In FIG. 3, a top side PCB laminate material is not shown and the components are not to scale for clarity and/or ease of understanding.

In some embodiments, a length (e.g., a distance in a Y-direction) of each cutout 32 may be at least twice the distance between the centers of adjacent features or traces on a layer of PCB material 34 (also known as a fiber pitch). For example, in some PCB laminate materials 34, the fiber bundles are 14-18 mils apart, wherein coupon 30 may be 360 mils (e.g., approximately 9 mm wide). Coupons 30 may be made smaller at the cost of slightly more noise. PCB material 34 is an internal layer formed free of solder mask. Outer layers may be free of copper near coupon 30 and all layers may be free of copper so light can pass a coupon area. Embodiments of coupon 30 have been determined to have remarkable noise canceling properties such that they will tolerate a few crossing traces without compromising performance.

The design shown in FIG. 3 can be used as a reference to align PCB 34 in a first direction (e.g., the X direction). Another coupon 30 rotated 90 degrees may be used as a reference to align PCB 34 in a second direction (e.g., the Y direction). In some embodiments (not shown), a single coupon 30 formed with cutouts 32 configured like concentric circles may cover all directions in one measurement, with some tradeoffs in noise rejection.

Figure 4:
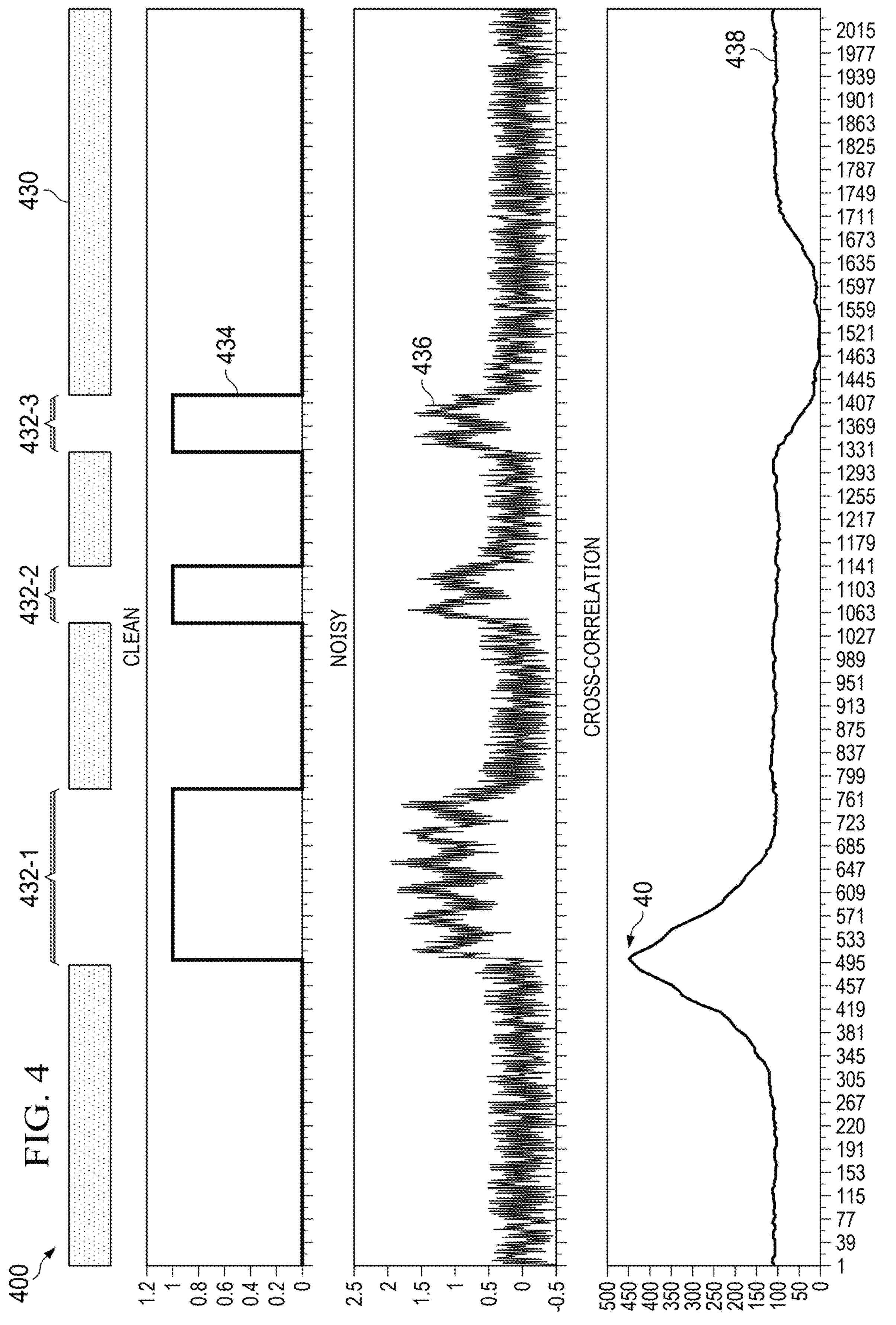
FIG. 4 depicts a chart illustrating performance of the coupon of FIG. 3.

FIG. 4 depicts a graph 400 illustrating performance of one slice or portion of coupon 430, which may be similar to coupon 30 depicted in FIG. 3. Ideal light line 434 represents ideal light passing through cutouts 432-1, 432-2 and 432-3. In reality the fiber bundles and resin will modulate the light and introduce blur and noise, resulting in output line 436. Cross-correlation line 438 represents the results of cross-correlation processing (described in greater detail below), with peak 40 illustrating a close approximation to a start of cutout 432-1 relative to a reference point (e.g., starting from the left side of graph 400). For clarity only one iteration of the 3D image is shown.

Figure 5:
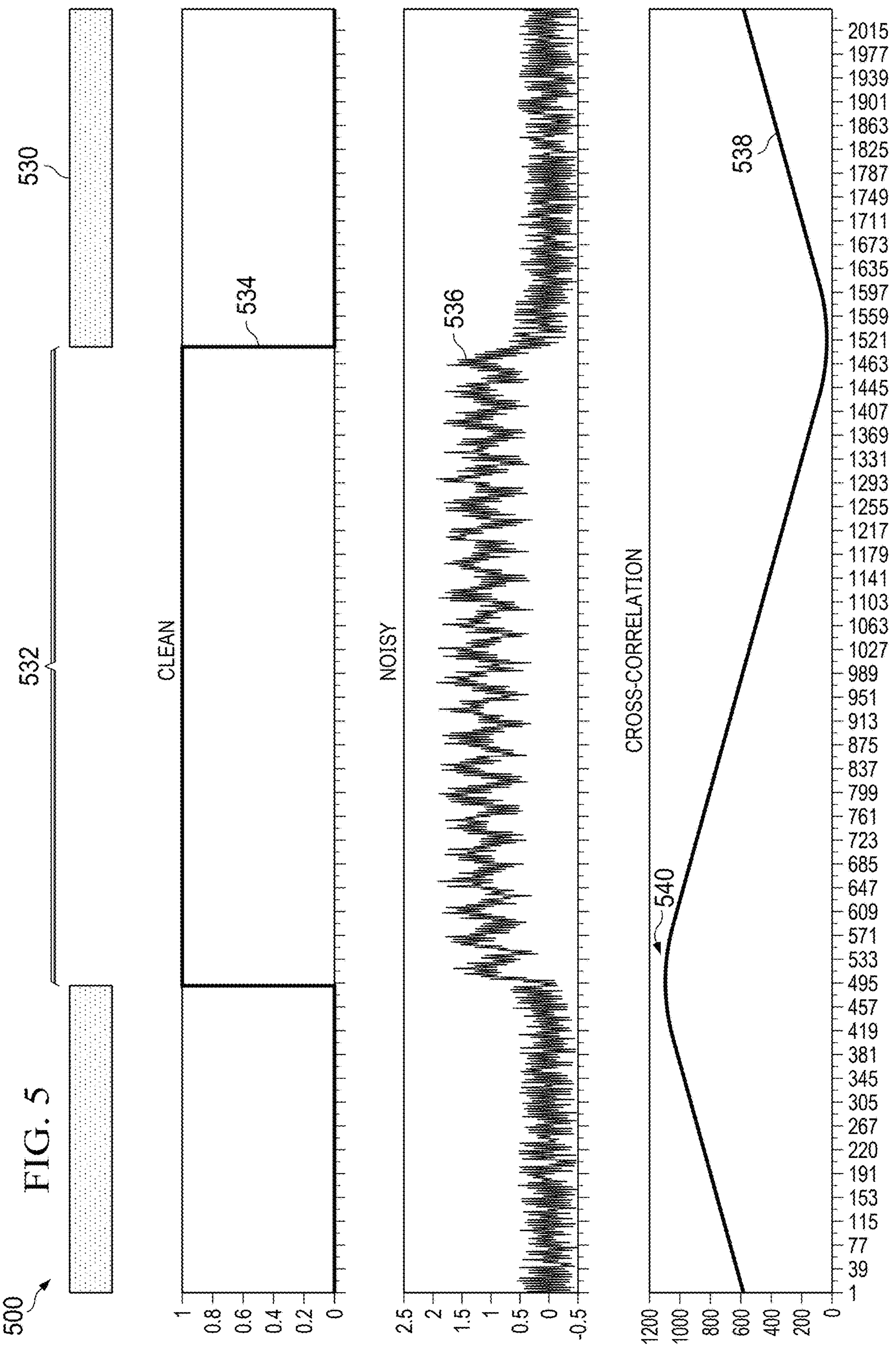
FIG. 5 depicts a chart illustrating performance of a round coupon.

For comparison, FIG. 5 depicts a traditional round pad performance, wherein a diameter of round pad 530 is the same as a length of coupon 430, ideal light line 534 represents ideal light passing through a single cutout 532, output line 536 illustrates the effect blur and noise have on ideal light line 534. Notably, peak 540 represents a start of cutout 532, but has a shallower slope, making it harder to identify and resulting in less accurate measurements than peak 40.

For example, a slope associated with peak 40 corresponding to coupon 430 may be 2.47 vs. 1.1 for a slope associated with peak 540 corresponding to coupon 530. The reason may be that the round pad approach (square shape in cross section) results in a triangular auto-correlation shape, which has a disadvantage when it comes to peak finding.

Optical Registration System Operation

An optical registration system may begin by projecting light through coupon 30, wherein a camera captures an image of the light. In some embodiments, laser light may represent ideal light. A processor (not shown) executes instructions to receive the image from the camera. The processor may perform zero padding to estimate signal components and calculate a two-dimensional fast Fourier transform ("FFT") of the image. The processor may multiply the calculated 2D FFT by a pre-calculated complex conjugate 2D FFT of coupon 30, then calculate a cross-correlation using an inverse 2D FFT.

Figure 6:
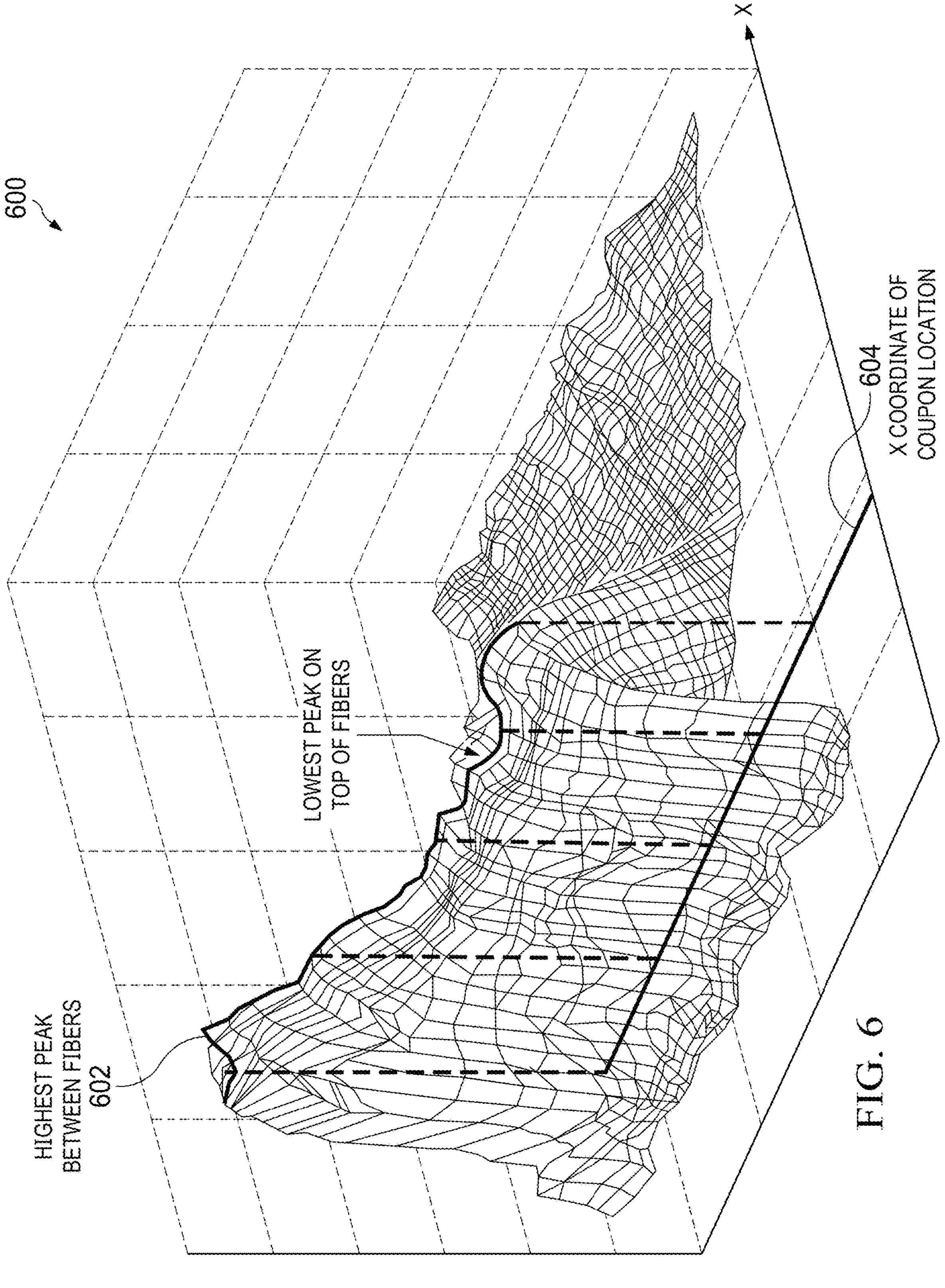
FIG. 6 depicts a graph illustrating cross-correlation of a cutout of an embodiment of a coupon.

Referring to FIG. 6, the processor may incrementally repeat these steps for a width of PCB material 34 and further execute instructions to find line 602 corresponding to a best fitting coordinate (e.g., an X-coordinate) 604, wherein coordinate 604 represents a correction factor for referencing a drilling machine to ensure the drills are entered or aligned (e.g., in the X-direction) relative to power plane pads or antipads (not shown). The processor may repeat this method for another coupon 30 rotated 90 degrees to find a line 602 corresponding to a best-fitting second coordinate (e.g., a Y-coordinate) 604 to ensure the drills are entered or aligned (in the Y-direction) relative to power plane pads or antipads (not shown).

Embodiments may enable more accurate backdrill to power plane registration, ensuring maximum backdrill-to-metal distances on higher voltage planes where CAF growth is a higher risk. Advantageously, embodiments may enable smaller antipads for improved power plane integrity and/or eliminate the need for resin fill.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A coupon for internal registration to an inner layer of a printed circuit board (PCB), the coupon comprising:
- a block of laminate material; and
- a plurality of cutouts in the block of material, wherein each cutout of the plurality of cutouts has a width based on a chirp waveform associated with a light source and each cutout of the plurality of cutouts is separated by an adjacent cutout based on the chirp waveform.

2. The coupon of claim 1, wherein each cutout of the plurality of cutouts comprises a rectangular shape.

3. The coupon of claim 2, wherein the coupon is configured for registration in a first direction.

4. The coupon of claim 3, wherein each cutout of the plurality of cutouts has a length based on a fiber pitch.

5. The coupon of claim 4, wherein the length is twice the fiber pitch.

6. The coupon of claim 1, wherein the plurality of cutouts comprises concentric circles.

7. The coupon of claim 1, wherein the coupon comprises copper.

8. A method for registration of a drill relative to an inner layer of a printed circuit board (PCB) laminate material, the method comprising:

forming a coupon with a plurality of cutouts, wherein the plurality of cutouts and a length of each cutout of the plurality of cutouts is based on a chirp waveform;

projecting light through the plurality of cutouts;

capturing an image of the light passed through the plurality of cutouts;

performing zero padding on the image of the image;

for a plurality of peaks, performing:

calculating a two-dimension (2D) fast Fourier transform (FFT) of the image;

multiplying a result of the 2D FFT by a complex conjugate 2D FFT of the coupon;

calculating a cross-correlation using an inverse 2D FFT; and determining a best-fitting coordinate of the plurality of peaks.

9. The method of claim 8, wherein each cutout of the plurality of cutouts comprises a rectangular shape.

10. The method of claim 9, wherein the coupon is configured for registration in a first direction.

11. The method of claim 10, further comprising performing the method on a second coupon for registration in a second direction.

12. The method of claim 9, wherein each cutout of the plurality of cutouts has a length based on a fiber pitch.

13. The method of claim 12, wherein the length is twice the fiber pitch.

14. The method of claim 8, wherein the plurality of cutouts comprises concentric circles.

15. A registration system for positioning a drill relative to a printed circuit board (PCB) laminate material, comprising:

a light source for projecting light onto a PCB;

a coupon comprising a plurality of cutouts, wherein each cutout of the plurality of cutouts has a width based on a chirp waveform and each cutout of the plurality of cutouts is separated by an adjacent cutout based on the chirp waveform;

a camera for capturing an image of the light passed through the coupon;

a processor;

a memory storing a set of instructions executable by the processor for:

communicating with the light source to project the light onto the coupon;

performing zero padding on the image of the image;

for a plurality of iterations:

calculating a two-dimension (2D) fast Fourier transform (FFT) of the image;

multiplying a result of the 2D FFT by a complex conjugate 2D FFT of the coupon;

calculating a cross-correlation using an inverse 2D FFT to determine a peak; and determining a best-fitting coordinate of the plurality of peaks.

16. The registration system of claim 15, wherein the light source is a laser.

17. The registration system of claim 15, wherein each cutout of the plurality of cutouts comprises a rectangular shape.

18. The registration system of claim 15, wherein the coupon is configured for registration in a first direction.

19. The registration system of claim 15, wherein the plurality of cutouts comprises concentric circles.

* * * * *